Figure 2:
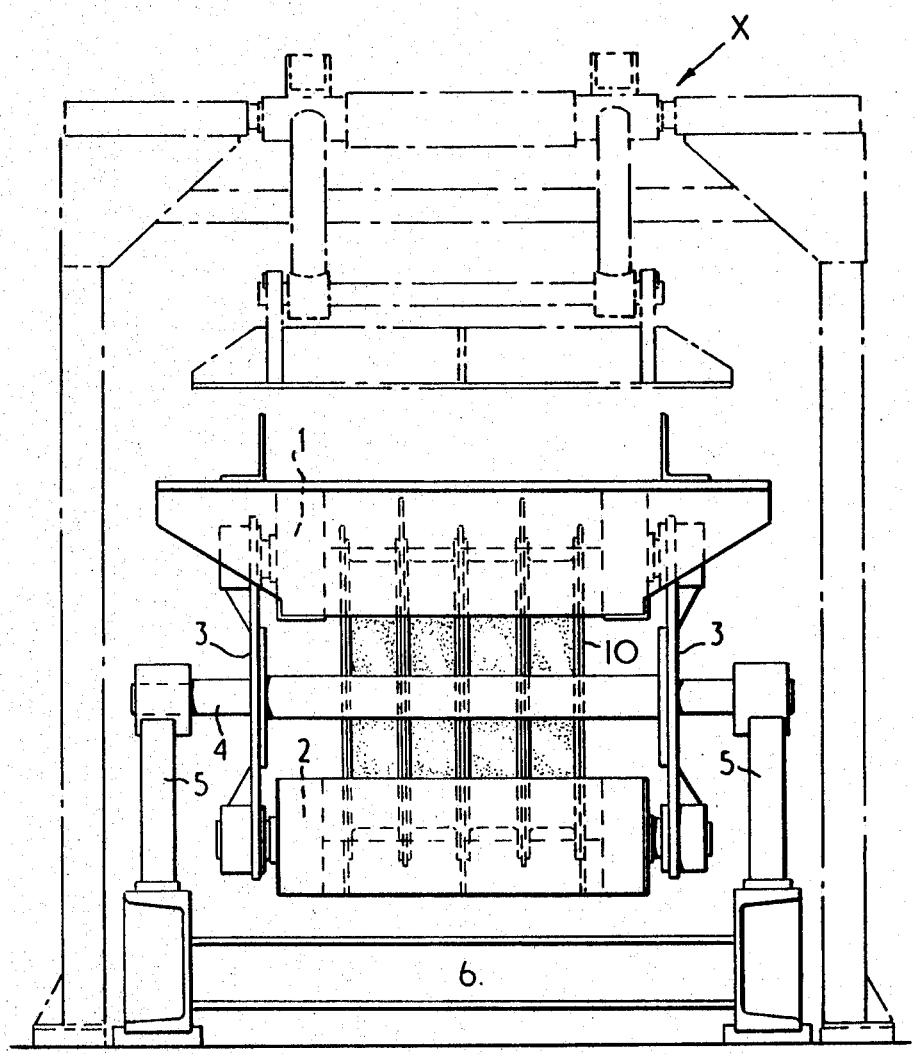

Jan. 31, 1967  B. A. LAMBERT  3,301,385
VIBRATORY APPARATUS
Filed Jan. 14, 1965  5 Sheets-Sheet 1
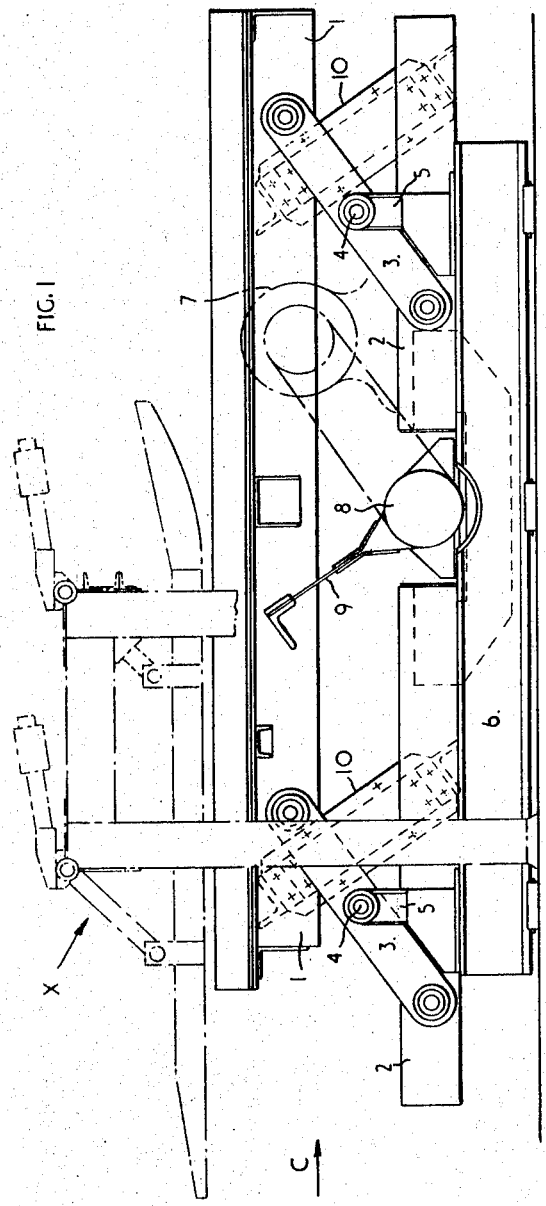
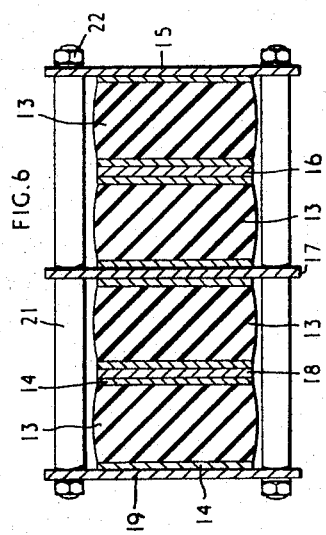

Jan. 31, 1967   B. A. LAMBERT   3,301,385
VIBRATORY APPARATUS

Filed Jan. 14, 1965   5 Sheets-Sheet 5

United States Patent Office 3,301,385
Patented Jan. 31, 1967

3,301,385
VIBRATORY APPARATUS
Bernard A. Lambert, Anglesey, Wales, assignor to McKenzie & Brown Limited, Caernarvon, Wales, a British company
Filed Jan. 14, 1965, Ser. No. 425,574
Claims priority, application Great Britain, Jan. 15, 1964, 1,821/64
4 Claims. (Cl. 198—220)

This invention relates to vibratory apparatus, such as a conveyor, screen or sifter, of the kind which consists of a balanced pair of upper and lower vibrating members, such as tables, troughs or tubes, which are pivotally supported for oscillating movement, usually in a vertical plane, such as by the vibrating members being interconnected, as a parallel motion linkage, by parallel links supported at their mid-lengths on a base or frame.

The vibrating members are spring-loaded to oscillate or vibrate equally and oppositely under the influence of a vibratory drive. The vibratory drive may comprise a separately-mounted motor driving an eccentric rotary unit mounted on one vibrating member and resiliently coupled to the other or an unbalanced motor or motors may be mounted on one or both of the vibrating members.

In known apparatus, various forms of spring-loading have been used, including blade springs which support or interconnect the vibrating members, supporting rubber blocks working in shear and helical compression springs inclined oppositely to pivoted supporting struts or links and acting between the vibrating members and their base or frame.

The present invention provides an improved spring-loading arrangement for vibratory apparatus comprising a balanced pair of upper and lower vibrating members, pivotal means supporting the vibrating members for oscillating movement thereof and spring means interconnecting the vibrating members to react to their oscillating movement.

According to the invention, the spring means comprises at least one spring unit consisting of at least one parallel pair of blocks of elastomeric material, each block having two parallel faces parallel with the corresponding faces of the other block of the pair, carriers respectively parallel to and bonded in surface contact to each of the parallel faces of the blocks and thrust-transmitting means connecting the carriers alternately to the upper and lower vibrating members respectively so that the oscillating movement of the members stresses the blocks in shear substantially symmetrically in the spring unit.

The term "elastomeric material" is intended to include natural and synthetic rubbers as well as the so-called synthetic elastomers, including in particular polyurethane, which can be used in substitution for rubber. For convenience, the blocks of elastomeric material will be referred to in this description as "rubber blocks."

The actual material, hardness, shape and dimensions of the rubber blocks will be selected to suit a particular apparatus so that the stiffness of their spring action will give a resonant operating condition.

The shape of the rubber blocks may be selected and designed to suit particular apparatus but preferably they are substantially rectangular blocks bonded to metal plate carriers. Other shapes however are not excluded, for example a coaxial set of cylindrical blocks bonded between coaxial cylindrical carriers might be employed. Also, the carriers may be of a rigid material other than metal, for example a hard grade of polyurethane.

A preferred construction in accordance with the invention is illustrated, by way of example, on the accompanying drawings, in which:

FIG. 1 is a side elevation of a vibratory conveyor used, in this instance, for conveying bags beneath a flattening platen, and FIG. 2 is an end elevation, in the direction of the arrow C on FIG. 1.

Figure 3:
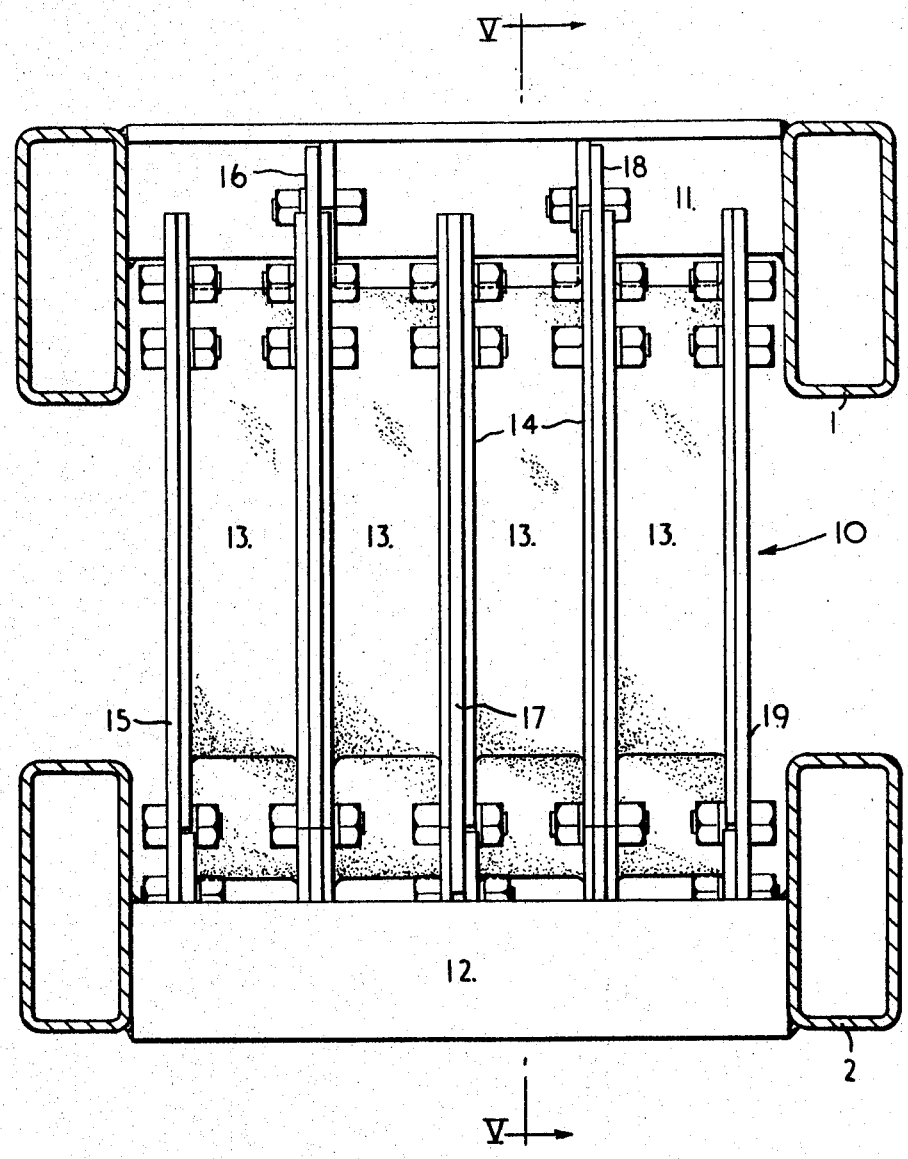
Figure 4:
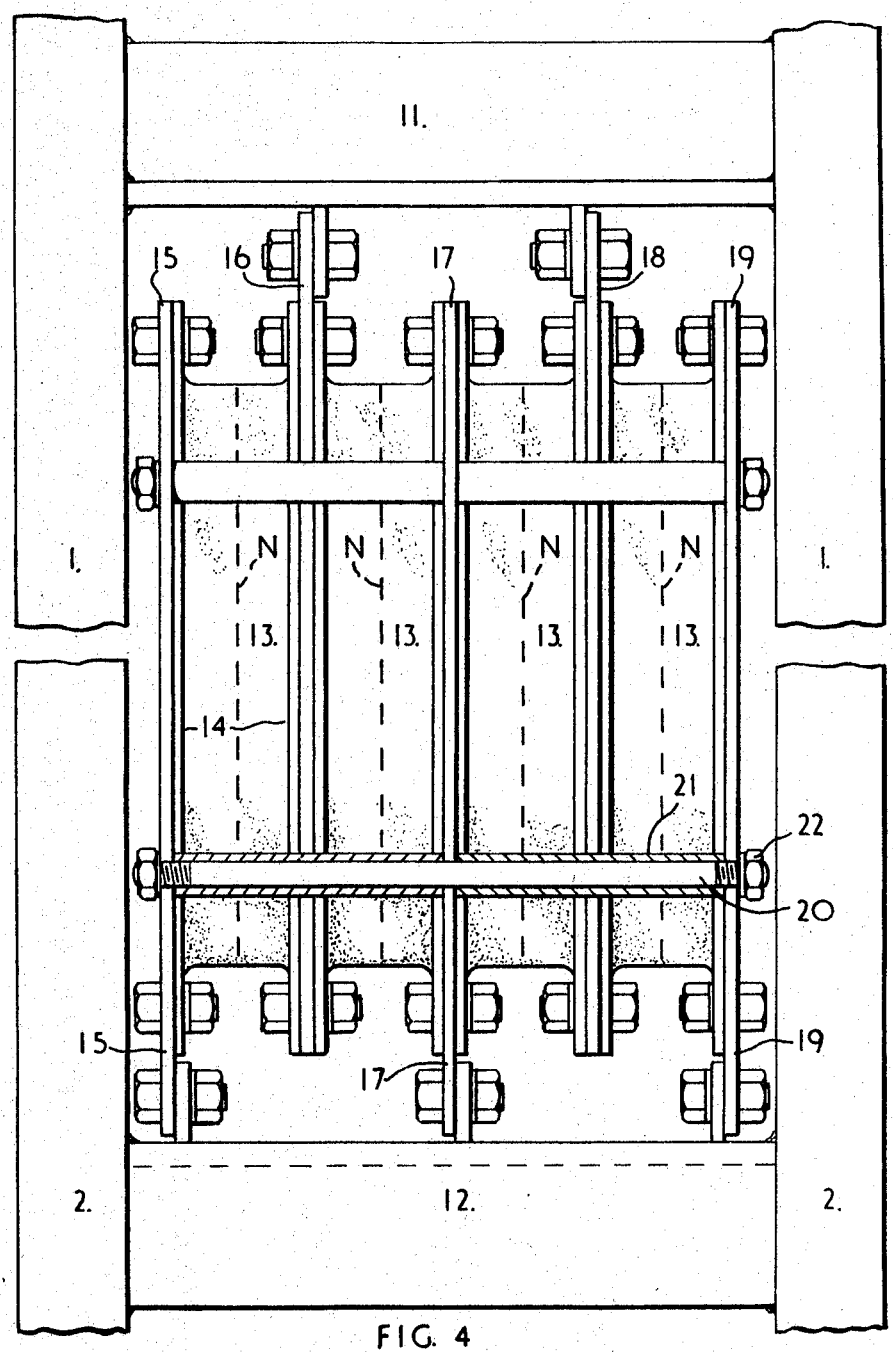
Figure 5:
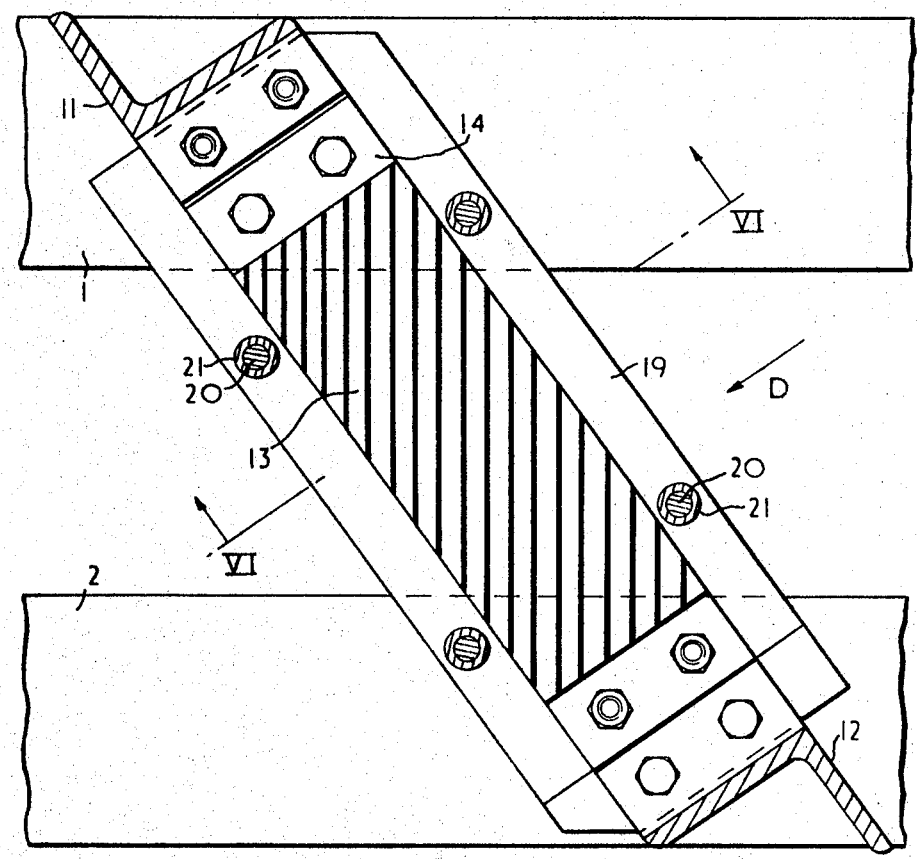

On a larger scale:

FIG. 3 is a transverse section, with some details omitted, of the vibratory conveyor part of the apparatus of FIGS. 1 and 2, FIG. 4 is a fragmentary inclined plan, as seen in the direction of the arrow D on FIG. 5, showing a spring unit, FIG. 5 is a longitudinal section on the line V—V of FIG. 3, and FIG. 6 is a cross-section on the line VI—VI of FIG. 5.

The bag-flattening platen part of the apparatus is generally indicated as X but does not form part of the vibratory conveyor apparatus and need not be described.

The conveyor comprises a pair of vibrating trough members 1 and 2 pivotallly interconnected and supported by oblique links 3 on pivot cross-shafts 4 mounted in pedestals 5 on a base frame 6. The links 3 and cross-shafts 4 form a parallel pair of pivoted link assemblies as a parallel-motion linkage with the members 1 and 2.

On the base frame 6, or on an independent support, there is mounted an electric or other motor 7 which has a belt drive to an eccentric unit 8 mounted on the lower trough 2 and resiliently coupled by a blade spring 9 to the upper trough 1 to vibrate the troughs in resonance under the reaction of a pair of spring units 10 obliquely interconnecting the troughs and inclined oppositely to the links 3.

The construction of one of the spring units is shown by FIGS. 4 to 6.

Between an opposed pair of L-shaped brackets 11 and 12, on the upper and lower troughs respectively, two pairs of substantially rectangular rubber blocks 13 extend as a set of four in parallel with parallel faces bonded to metal carrier plates 14 bolted to thrust plates 15, 16, 17, 18 and 19 which alternately oppositely project beyond the blocks and their carrier plates and are bolted by the projecting ends to the brackets 11 and 12 respectively.

The outer and middle plates 15, 17 and 19, which are bolted to the lower bracket 12, are also cross-tied and braced, to form a rigid framework, by rods 20 and tubular spacers 21 retained by nuts 22.

The intermediate plates 16 and 18 are simply bolted to the upper bracket 11.

It can be seen that the thrust plates 15 to 19 are arranged to transmit thrust substantially symmetrically between the brackets 11 and 12 and that each rubber block 13 will, on vibration of the troughs, be stressed in shear between its carrier plates 14.

With proper balanced design of the apparatus, it is found that each rubber block in operation is stressed symmetrically on either side of a medial nodal plane, indicated by the line N on each block in FIG. 4.

Any even number of rubber blocks may be used in pairs in a spring unit and any number of spring units may be used, according to the mass and length of the vibrating members, but for symmetry and balance an even number in both cases is preferable.

What is claimed is:

1. Vibratory apparatus comprising a balanced pair of upper and lower vibrating members, pivotal means supporting said members for oscillating movement thereof in a vertical plane and spring means interconnecting said members to react to said oscillating movement, in which said spring means comprises at least one spring unit consisting of at least one parallel pair of blocks of elastomeric material, each said block having two vertically-disposed parallel faces parallel with the corresponding faces of the other block of the pair, carriers having vertically-disposed faces respectively parallel to and bonded in surface contact to each of said vertically-disposed faces of said blocks, and thrust-transmitting means connecting said carriers alternately to said upper and lower members respectively so that said oscillating movement stresses said blocks solely in shear substantially symmetrically in said unit.

2. Vibratory apparatus according to claim 1, in which said blocks are similar, substantially rectangular blocks in parallel side-by-side, and said faces and carriers are plane and extend in parallel vertical planes.

3. Vibratory apparatus according to claim 2, in which said pivotal means comprise a parallel pair of pivoted link assemblies extending obliquely between and pivoted to said members as a parallel-motion linkage and a parallel pair of said spring units is provided oppositely inclined to said link assemblies between said members.

4. A spring unit for interconnecting a pair of vibratory members comprising at least one parallel pair of similar, substantially rectangular blocks of elastomeric material, each said block having two parallel faces parallel with the corresponding faces of the other block of the pair, a carrier plate respectively parallel to and bonded in surface contact to each of said faces, at least three thrust plates in parallel with said carrier plates and respectively between and at opposite sides of said blocks, said thrust plates alternately oppositely projecting beyond said blocks, and cross-tie means extending transversely between and rigidly interconnecting alternate thrust plates of said unit.

References Cited by the Examiner

UNITED STATES PATENTS

| 2,729,332 | 1/1956 | Gruner | 198—220 |
| 2,936,064 | 5/1960 | Schuessler | 198—220 |
| 3,134,483 | 5/1964 | Musschoot | 198—220 |

FOREIGN PATENTS 177,112  12/1953  Austria.

SAMUEL F. COLEMAN, *Primary Examiner.*

EDWARD A. SROKA, *Examiner.*